June 15, 1943.  G. B. SCHOENROCK  2,321,864
TANDEM WHEEL TRAILER
Filed Aug. 14, 1941  2 Sheets-Sheet 1
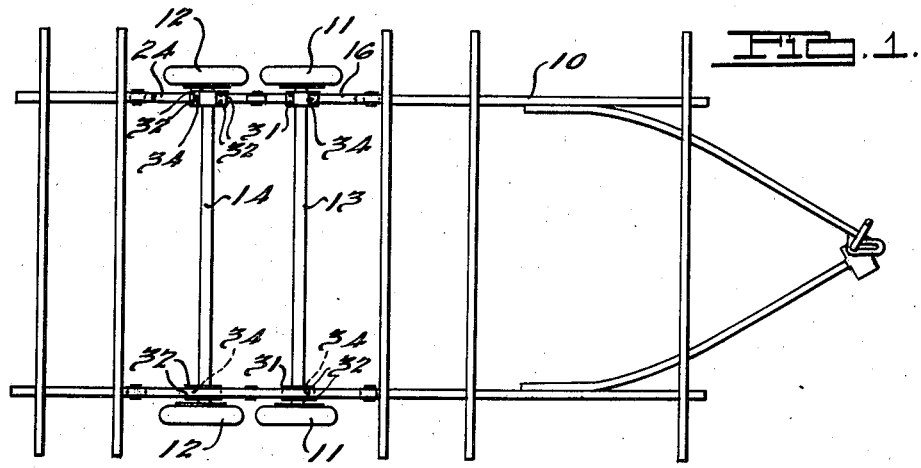
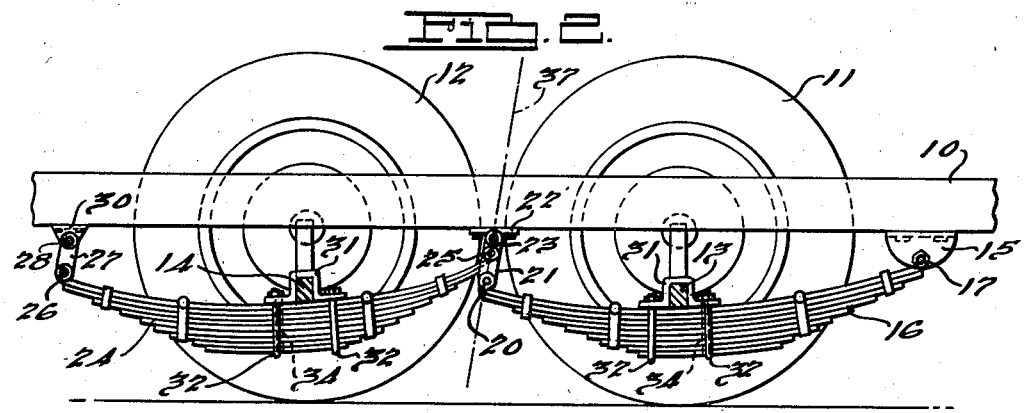
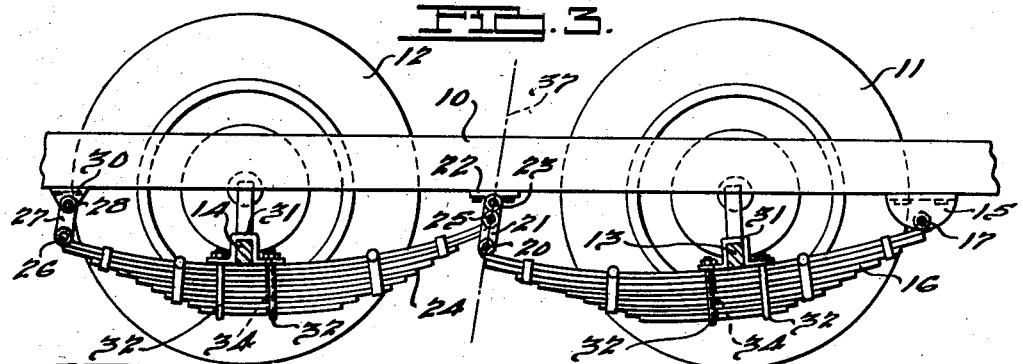
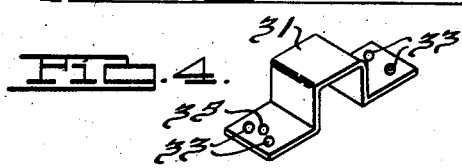
INVENTOR
George B. Schoenrock.
BY
ATTORNEY

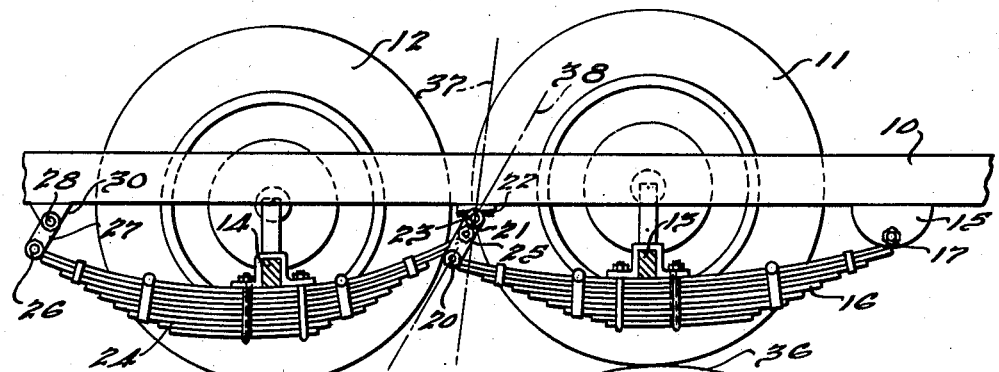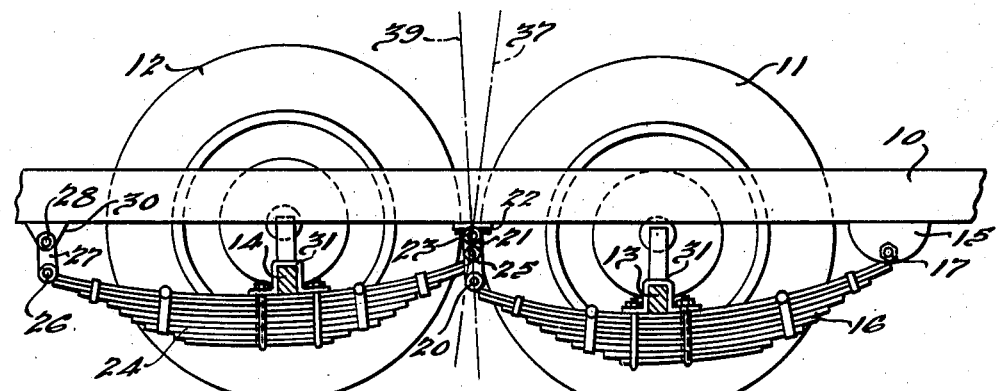

Patented June 15, 1943

2,321,864

UNITED STATES PATENT OFFICE 2,321,864

TANDEM WHEEL TRAILER

George B. Schoenrock, Detroit, Mich.

Application August 14, 1941, Serial No. 406,795

4 Claims. (Cl. 280—104)

This invention relates to spring suspension and axle assemblies especially adapted for tandem wheel trailers and other multiple wheel road vehicles.

The principal object of the invention is to improve the art of multiple wheel road vehicles.

Another object of the invention is to provide for easy shifting of weight distribution with respect to wheels and axles in accordance with the distribution of weight of furnishings after the trailer on similar multiple wheel road vehicle is built.

A further object is to provide a spring suspension system for tandem wheels of a road vehicle such that when either set of wheels or a single wheel of one set hits a bump or depression in roadway, the reaction is taken by its springs or spring and so distributed to both sets of springs that one set acts as a shock absorber for the other set.

Another object is to provide a spring suspension system for tandem wheels of a road vehicle so constructed that when one wheel passes over a hole or depression in the roadway, the other wheel or wheels on the same side of the vehicle and the spring or springs therefor support the wheel going over the hole or depression and thus lessens shock.

A still further object of the invention is to provide a spring suspension system of the above character which, at higher vehicle speeds, causes the wheels passing over holes or depressions partially to override the same rather than dropping to the bottoms of such holes or depressions.

Other objects, features and advantages will become apparent from the following description and appended claims.

For the purpose of illustrating the genus of the invention, reference may be had to the accompanying drawings wherein is depicted an illustrative construction embodying the principles of this invention.

Reference is now made to the accompanying drawings wherein like numerals refer to like and corresponding parts throughout the several views in which:

Fig. 1 is a top plan view of a trailer chassis construction with parts broken away to better illustrate the invention.

Fig. 2 is a fragmentary side elevational view of the construction shown in Fig. 1.

Fig. 3 is a fragmentary side elevational view similar to Fig. 2 showing the construction depicted in Fig. 2 but assembled in a different relationship with respect to each other.

Fig. 4 is an enlarged perspective view of a reversible saddle shown in Figs. 1 to 3 inclusive.

Figs. 5 and 6 are fragmentary side elevational views similar to Fig. 2 showing the spring suspension construction in different operative positions.

Referring now particularly to Figs. 1 to 4 inclusive, a chassis frame 10 of a trailer or similar multiple wheeled road vehicle is supported by a plurality of ground engaging wheels in 11 and 12 suitably journaled for rotation on axles 13 and 14. Secured to these side members of vehicle frame 10 are depending pivot pin support brackets 15 which are pivotally connected to the forward ends of a pair of leaf springs 16 by means of a pair of pivot pins 17. The rear ends of these springs 16 are pivotally connected by means of pins 20 to shackles 21 which in turn are pivotally connected by pins 23 to shackle hangers 22 secured to the frame 10. Each leaf spring 24 associated with the axle 14 is pivotally connected at the forward end by means of a pivot pin 25 to the shackle 21, the pivot pin 25 being located between the pivot pins 20 and 23 and preferably spaced approximately twice as far from the lower pivot 20 as from the upper pivot 23. The rear end of each spring 24 is pivotally connected by means of a pin 26 to a shackle 27 which is pivotally connected by means of a pin 28 to a shackle hanger 30 which is fixed to a side member of the vehicle frame 10.

The leaf springs 16 and 24 are secured to the axles 13 and 14 by means of reversible saddles 31 and U-bolts 32 adapted to project through suitable bolt openings 33 at the ends of the saddles 31. Pins 34 are adapted to project through a suitable bolt opening 35 provided through one end of each saddle 31 and the springs 16 and 24 at the approximate midpoint of each of the springs.

In Figs. 1 and 2 the reversible saddles 31 shown as assembled relative to the axles 13 and 14 with the forward saddle 31 extending generally rearwardly with respect to the center of the leaf spring 16 and the shackle 31 for the spring 24 extending generally forwardly with respect to the center of that spring. The pins 34 project through the openings 35 in the saddles 31 and through the openings at the centers of the springs to maintain the relative longitudinal positions of the reversible saddles and the associated springs.

In Fig. 3, the saddles 31 are shown as assembled with the shackled front spring 16 and extending forwardly from the center of these springs while the saddles 31 for springs 24 extend generally rearwardly from the centers of those springs. A third arrangement of the axles 13 and 14 relative to the springs 16 and 24 and the frame 10 may be had by extending both saddles 31 in a generally forward direction relative to the centers of springs 16 and 24, and a fourth arrangement may be had by extending both saddles 31 in a generally rearward direction relative to the centers of springs 16 and 24. In this manner, after the trailer or similar road vehicle is built, there may be made the desired shifts of weight distribution to the wheels and axles in accordance with the distribution of weight of the furnishing of the trailer or similar road vehicle. In each of these assembled positions the pins 34 projecting through the openings 35 in the reversible saddles 31 and through the central openings in the leaf springs 16 and 24 fix the axles and reversible saddles longitudinally of the springs 16 and 24.

Referring to Figs. 2, 5, and 6, it is noted that each spring 16 is connected to the frame 10 by means of a single pivot pin 17 while the adjacent ends of springs 16 and 24 are connected to each other and to the frame 10 by means of a double shackle 21 and the rear end of each spring 24 is pivotally connected to the frame 10 by means of a single shackle 27. As indicated in Fig. 5, when the front wheel 11 passes over a bump as indicated at 36, swinging of the center double shackle 21 and the single rear shackle 28 distributes the reaction of the front wheel by employing the rear spring 24 as a shock absorber. Under average vehicle load conditions and with the assembled axle and spring arrangement illustrated in Figs. 2, 5 and 6 with the wheels 11 and 12 resting on a level smooth road surface, the pivot pins of the double shackle 21 will lie in a single plane illustrated by the dot and dash lines 37 in Figs. 2, 5 and 6. As indicated in Fig. 5, the plane of the pivot pins 20, 25 and 23 will be swung to the position indicated by the dot and dash line 38 when the front wheels of the vehicle pass over a bump 36 which flattens out the spring 16 and slightly increases the bowing of the spring 24 as well as swinging both shackles 21 and 27 rearwardly so that spring 16 attempts to pick up the load afforded by the axle 14 and wheels 12. This additional load as well as the force required to increase the bowing of spring 24 causes spring 24 to act as a shock absorber for spring 16.

As illustrated in Fig. 6, when a front wheel 11 encounters a hole or a depression as indicated at 40, the other wheel 12 and spring 24 support the wheel 11 going over the hole or depression and cause wheel 11 to be relieved to a certain extent of its load and thereby relieves shock. As the wheel 11 drops into the depression 40 the bowing of spring 16 is increased tending to flatten out the leaves of spring 24 and this tends to keep the axle 13 elevated and the shackles 21 and 27 are swung forwardly from their normal position indicated by dot and dash line 37 to the position indicated by dot and dash line 39. When the vehicle hits a hole or a bump in the road surface some of the reaction is taken by the forward springs and the shock on the forward spring is relieved by the fact that the rear end thereof is free to rock the center shackle 21 except as yielding is opposed by the resistance afforded by increased bowing of the rear springs or flattening out of the rear springs and the load reaction or support afforded by the wheel and axle assembly of the rear wheel unit. At higher vehicle speeds the wheel going over a hole or depression will be sufficiently supported to prevent its going all of the way to the bottom of a depression 40 due to the supporting action afforded by the other wheel.

As many changes could be made in the above indicated constructions and many apparently widely different embodiments of this invention could be had without departing from the spirit and scope thereof, it is intended that all matter contained in the above description or shown in the accompanying drawings will be interpreted as illustrative and not in a limited sense.

What is claimed is:

1. A road vehicle including a frame, a plurality of axles supporting one end of said frame, springs individual to each axle, the springs individual to one axle each being connected at one end by a single pivotal connection to said frame, the springs individual to the other axle being shackled at one end to said frame and a shackle common to the two springs pivotally connected in depending relationship to said frame and pivotally connected directly to the remaining ends of said springs, the pivotal axes between said springs and said common shackle lying substantially in a plane including the pivotal axes between said common shackle and said frame.

2. A road vehicle including a frame, a plurality of axles supporting one end of said frame, springs individual to each axle, the springs individual to one axle each having one end pivotally connected by a single pivot means to said frame, the springs individual to another axle being shackled at one end to said frame, and shackle means common to the two springs pivotally connected in depending relationship to said frame and pivotally connected directly to the remaining ends of said springs with the pivotal connection between each said common shackle and the springs directly connected to the frame being more remote from the pivotal connection between said common shackle and the frame than is the pivotal connection between said common shackle and the springs shackled at one end to said frame with respect to the pivotal connection between the frame and said common shackle.

3. A road vehicle including a frame, a plurality of axles supporting one end of said frame, springs individual to each axle, the springs individual to one axle each having one end pivotally connected by a single pivot means to said frame, the springs individual to another axle being shackled at one end to said frame, and shackle means common to the two springs pivotally connected in depending relationship to said frame and pivotally connected to the remaining ends of said springs with the pivotal connections between said common shackle and the said remaining ends of the springs being separated by a greater distance from each other than the distance from the pivotal connection between said common shackle and the frame and the pivotal connection of said common shackle to any spring.

4. A road vehicle including a frame, a plurality of axles supporting one end of said frame, springs individual to each axle, the springs individual to one axle each having one end pivotally connected by a single pivot means to said frame, the springs individual to another axle being shackled at one end to said frame, and shackle means common to the two springs pivotally connected in depending relationship to said frame and pivotally connected to the remaining ends of said springs with the pivotal connection of the springs to said common shackle being spaced a distance approximately double that from the pivotal connection of said common shackle and the frame to the pivotal connection of said common shackle to one spring.

GEORGE B. SCHOENROCK.